Jan. 15, 1924.
L. JOHNSON
PIPE COUPLING
Filed Aug. 15, 1921
1,481,062
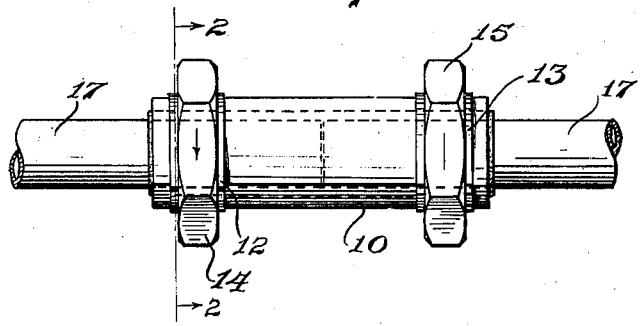
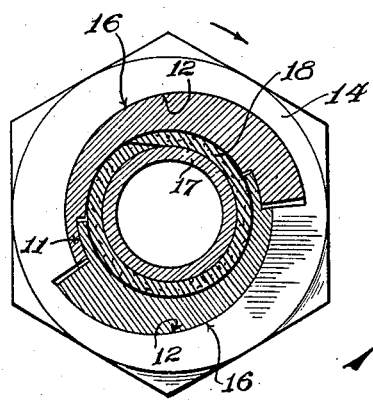
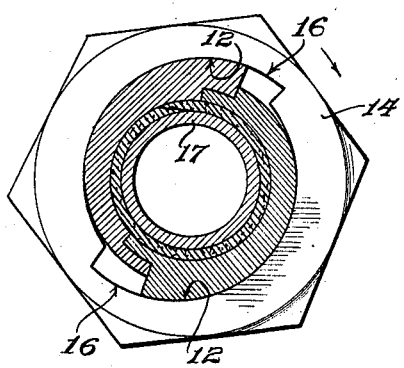
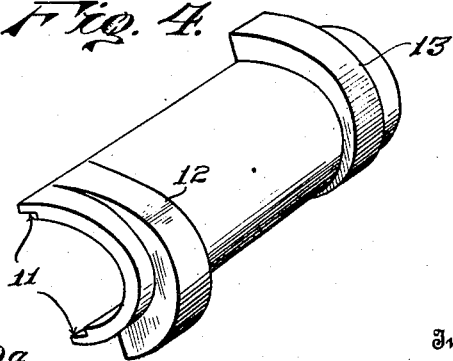
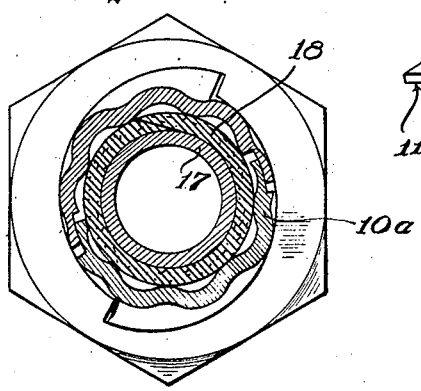
Inventor
L. Johnson.
By Lacey, Attorneys Patented Jan. 15, 1924.

1,481,062

UNITED STATES PATENT OFFICE.

LLOYD JOHNSON, OF UHRICHSVILLE, OHIO.

PIPE COUPLING.

Application filed August 15, 1921. Serial No. 492,327.

*To all whom it may concern:*

Be it known that I, LLOYD JOHNSON, a citizen of the United States, residing at Uhrichsville, in the county of Tuscarawas and State of Ohio, have invented certain new and useful Improvements in Pipe Couplings, of which the following is a specification.

This invention relates to an improved pipe coupling and has as one of its principal objects to provide a device of this character whereby pipe ends may be connected without the necessity for threading the pipes.

A further object of the invention is to provide a coupling which may be readily applied and wherein, in the instance of a pipe line, the coupling may be fitted in place without removing one of the pipes of the line at the point where the coupling is to be applied.

And the invention has as a still further object to provide a coupling which will form a tight closed joint between the pipe ends.

Other and incidental objects will appear hereinafter.

In the drawing:

Figure 1 is a fragmentary side elevation showing my improved coupling applied.

Figure 2 is a sectional view on the line 2—2 of Figure 1, looking in the direction of the arrows, this view illustrating the adjacent clamping nut before being rotated.

Figure 3 is a view similar to Figure 2, showing the clamping nut rotated.

Figure 4 is a detail perspective view showing one of the sections of the clamping sleeve of the device, and Figure 5 is a transverse sectional view illustrating a slight modification of the invention.

Referring now more particularly to the drawing, it will be seen that I employ a metallic coupling sleeve 10 which, as suggested in Figure 4, is formed of companion semi-cylindrical sections cut away at their longitudinal margins, as indicated at 11, so that when the sections are assembled lapped joints are formed therebetween. Rising from each of the sections near its ends are oppositely directed cam shoulders 12 and 13 extending in a direction circumferentially of the sleeve, the shoulders 12 of the sections alining as do also the shoulders 13. Removably fitting over one end of the sleeve to coact with the pair of shoulders 12 is a cam nut 14 and removably fitting over the opposite end of the sleeve to coact with the pair of shoulders 13 is a similar nut 15. As best shown in Figures 2 and 3, these nuts are cut away at their inner sides to provide circumferential cam faces 16, the cam faces of the nuts 14 mating with the shoulders 12 and the cam faces of the nut 15 mating with the shoulders 13. Thus, by rotating the nut 14 in a clockwise direction and rotating the nut 15 in a counter-clockwise direction, the cam faces thereof will be caused to ride over the shoulders 12 and 13 for clamping the sections of the sleeve tightly together. Preferably, each nut is provided with but a single pair of cam faces.

In Figure 1 of the drawing, I have shown the coupling in connection with conventional pipe ends 17 and arranged within the coupling sleeve 10 to overlie the joint between said pipe ends is a gasket sleeve 18. This gasket sleeve may be formed of rubber or other approved material and is preferably split longitudinally so that said gasket may be readily arranged about the pipe ends at the joint therebetween. However, in applying the coupling, the pipe ends are first spread apart when the nut 14 is applied over one pipe end and the nut 15 over the other pipe end. The gasket 18 is then arranged in place when the sections of the coupling sleeve are assembled around the gasket. The nuts 14 and 15 are then advanced over the ends of the sleeve to coact with the pairs of shoulders 12 and 13 when said nuts are rotated in opposite directions for clamping the sections of the coupling sleeve together and binding the sections about the pipe ends. A secure sealed joint will thus be provided between the pipe ends and, as will be perceived, the coupling may be readily installed.

In Figure 5 of the drawing, I have illustrated a slight modification of the invention which is substantially identical with the preferred construction with the exception that the coupling sleeve, indicated at $10^a$, is corrugated to enhance the gripping action of the sleeve upon the pipe ends for holding said ends against separation.

Having thus described the invention, what is claimed as new is:

A pipe coupling comprising a tubular gasket to be fitted about meeting pipe ends, a contractible longitudinally split corrugated sleeve fitting about said gasket and having external circumferentially extending cam portions, and a rotatable tubular body member fitting about said sleeve and having internal cam portions co-operating with the cam portions of the sleeve whereby a rotation of the body member upon the sleeve in one direction contracts the sleeve and in the opposite direction permits the sleeve to expand.

In testimony whereof I affix my signature.

LLOYD JOHNSON. [L. S.]